United States Patent [19]
Dezawa et al.
[11] 3,917,716
[45] Nov. 4, 1975

[54] METHOD FOR RAISING THE CURIE POINT OF FERROMAGNETIC CHROMIUM DIOXIDE

[75] Inventors: Shin-Ichiro Dezawa; Tatsuji Kitamoto, both of Odawara, Japan

[73] Assignee: Fuji Photo Film Co., Ltd., Minami-ashigara, Japan

[22] Filed: May 16, 1973

[21] Appl. No.: 361,003

[30] Foreign Application Priority Data

May 17, 1972 Japan ............................... 47-48919

[52] U.S. Cl. ............................. 423/607; 252/62.51
[51] Int. Cl.² .......................................... C01G 37/02
[58] Field of Search .................. 423/607; 252/62.51; 117/234

[56] References Cited

UNITED STATES PATENTS

| | | | |
|---|---|---|---|
| 3,512,930 | 5/1970 | Bottjer et al. | 423/607 |
| 3,667,913 | 6/1972 | Hund | 423/607 X |
| 3,725,281 | 4/1973 | Rodi et al. | 252/62.51 |

*Primary Examiner*—Jack Cooper
*Attorney, Agent, or Firm*—Sughrue, Rothwell, Mion, Zinn & Macpeak

[57] ABSTRACT

The Curie point of ferromagnetic chromium dioxide is raised by heating ferromagnetic chromium dioxide powder in intimate contact with a reducing agent in the gaseous phase at a temperature above 60°C.

12 Claims, No Drawings

METHOD FOR RAISING THE CURIE POINT OF FERROMAGNETIC CHROMIUM DIOXIDE

BACKGROUND OF THE INVENTION

1. Field of the Invention

The present invention relates to a method for raising the Curie point of ferromagnetic chromium dioxide.

2. Description of the Prior Art

Chromium dioxide has been noted as a ferromagnetic substance for use in a magnetic recording medium. In particular, as compared with conventional gamma-hematite, chromium dioxide provides a large Br/Bm value, an excellent surface property and a coercive force as high as 400 to 600 oersteds when dispersed in a binder to form a magnetic recording layer. Accordingly, chromium dioxide has been used as a ferromagnetic substance in a magnetic recording medium of high density.

However, chromium dioxide has the defect that since its Curie point is as low as about 120°C, it undergoes a partial reduction in magnetism when heated to a temperature of 50° to 60°C. Therefore, it has been desired to produce chromium dioxide having a high Curie point so as to improve the above-described defect.

As processes for changing the Curie point of chromium dioxide, there is known a process to raise the Curie point by about 30°C by adding iron thereto to thereby partly replace chromium atoms in the chromium dioxide with iron atoms. This influences the mutual magnetic interaction between chromium-chromium (see U.S. Pat. No. 3,034,988). As described in U.S. Pat. Nos. 3,034,988 and 3,068,176, it is also known that when manganese, vanadium or fluorine is added to chromium dioxide a chromium atom is replaced by manganese or vanadium, or oxygen is replaced by fluorine, to thereby reduce the Curie point of the chromium dioxide.

As described above, in conventionally known methods different elements are added to chromium dioxide to influence the mutual magnetic interaction between chromium-chromium, thereby to change the Curie point.

SUMMARY OF THE INVENTION

In contrast, in the present invention the Curie point is changed not by adding different elements to chromium dioxide but by heating chromium dioxide produced in a known manner and having a suitable coercive force in a gaseous phase reducing agent, e.g., a vapor of an organic solvent or in a stream of hydrogen.

It is thus one object of the present invention to provide a process for increasing the Curie point of compositions comprising ferromagnetic chromium dioxide.

It is another object of the present invention to provide a process for obtaining ferromagnetic chromium dioxide having superior recording properties.

DETAILED DESCRIPTION OF THE INVENTION

The chromium dioxide used as a starting material in the present invention is that prepared by any conventionally known process, e.g., a process as described in U.S. Pat. No. 2,956,955, where chromium dioxide is synthesized by hydrothermal reaction from chromic acid anhydride at high temperature under high pressure, or where antimony, tin or tellurium is added to the resulting product as described in U.S. Pat. Nos. 2,923,683; 2,923,684, or Japanese Pat. Publication No. 829/63 to thereby produce needle-like chromium dioxide of a 400 – 600 oersted coercive force, 0.3 – 1.0 μ in length and 3 : 1 – 10 : 1 in axial ratio; a two-step process as described in U.S. Pat. No. 3,371,043 wherein reaction is conducted under low pressure followed by reaction under high pressure; a process of oxidizing trivalent chromium compounds as described in U.S. Pat. No. 3,278,263; or like processes. All such chromium dioxides can be converted to chromium dioxide having a raised Curie point in accordance with the present invention.

Those materials described in U.S. Pat. Nos. 2,885,365; 2,923,685; 3,034,988; 3,068,176; 3,078,147; 3,117,093; 3,243,260; 3,371,043; 3,423,326; and 3,449,073 and in DT-PS 1,116,134, DT-OLS 2,006,399 can also be used.

In the present invention, ferromagnetic chromium dioxide for use in magnetic recording mediums prepared by methods as above-described is used, and, in particular, chromium dioxide of 400 – 600 oersted in coercive force, 0.3 – 1.0 μ in length, 3:1 – 10:1 in axial ratio and more than 70 emu/g in saturation magnetization, which provides a Br/Bm value of not less than 0.8 when dispersed in a binder and oriented in a magnetic field after being applied to a support, is used.

The Curie point of such chromium dioxide can be raised by heating it to above about 60°C, preferably to a temperature of 100° – 200°C in a stream comprising a gaseous phase reducing agent.

The reducing agents of the present invention are not particularly limited, and they may be freely selected so long as they do not exert a harmful effect on the chromium dioxide being treated. While not mandatory, the reducing agent is generally diluted with an inert gas, such as nitrogen, helium, argon, etc. Dilution, when practiced, is generally used for one of two reasons. Firstly, by diluting it becomes unnecessary to critically control small amounts of gaseous reducing agent, rather, one can easily control larger amounts of a combined reducing agent/inert gas stream. The second main reason for using an inert gas is to dilute a strong reducing agent to obtain the desired affect. The reducing agent can be passed into the inert gas stream in any manner.

When the mixture ratio of reducing agent and inert gas approaches the flammability limit of the system, the system can be diluted with an appropriate amount of air.

The reducing agent must be one that is gaseous at the treating temperature. Though all reducing agents which meet this criteria can be used, it is preferred to use a reducing agent which is gaseous in the temperature range of room temperature to 60°C or which has a comparatively high vapor pressurs.

Examples of such reducing agents include hydrogen gas, various organic solvents and other reducing materials. If desired, the reducing agent can be obtained by thermally cracking a high molecular weight compound to yield a relatively low molecular weight reducing agent, for example, epoxy esters, cellulose acetate butyrate and the like can be thermally cracked. For example, when heated at a temperature of 100° – 300°C (typical cracking conditions) in a current of an inert gas such as $N_2$, He, Ar, etc., and air, organic compounds generating hydrocarbons, aldehydes, esters, ethers, etc., which are gaseous at reaction conditions are effectively used.

Specific examples of the organic solvent reducing agents most preferably used include, e.g., hydrocarbons having from 1 to 10 carbon atoms such as methane, ethane, propane, cyclohexane, ethylene, butylene, benzene, toluene, etc., alcohols having from 1 to 10 carbon atoms such as methanol, ethanol, propanol, decanol, etc., ethers having from 1 to 10 carbon atoms such as methyl ether, ethyl ether, butyl ethyl ether; esters having from 1 to 10 carbon atoms such as methyl acetate, butyl acetate, methyl salicylate, diethyl malonate; aldehydes having from 1 to 10 carbon atoms such as formaldehyde, acetaldehyde, propionic acid aldehyde or mixtures thereof. The treating temperature, treating time and partial pressure of the reducing agent have a great influence on the effect thereof. When the temperature is low, the effect of the treatment is small, while when the temperature is high, the effect is large. However, if the treatment temperature is as high as above 300°C, then since the chromium dioxide is reducible to nonferromagnetic chromium compounds, the treating time must be shortened or the partial pressure of the reducing compound or hydrogen must be lowered. The chromium dioxide converts to non-ferromagnetic chromium compounds at temperatures greater than 450°C even when no reducing compound is present. When the treatment is conducted for a excessively long time, the chromium dioxide can also be converted to non-ferromagnetic compounds.

The exact treating time is decided by the kind(s) of reducing gas used, the partial pressure, and the treating temperature. For example, in the case of using city gas which is not diluted with an inert gas, when treated at 200°C for 3 hours, the chromium dioxide changes to the non-ferromagnetic chromium compound form. On the other hand, in the case of using city gas which is diluted to 1/1000 its original volume, when treatment is at 200°C for 5 hours the chromium dioxide does not lose its ferromagnetism. In the case of a high partial pressure, the effect is larger. For example, it is possible to treat at a partial pressure greater than atmospheric pressure in means resistant to elevated pressures, whereby a large effect is obtained. The treating time, and partial pressure can thus be greatly varied with a suitable treating temperature whereby the effect of this invention is increased. However, it is most preferred that the treating time be from 30 minutes to 24 hours, and the partial pressure be from about 1/1000 atmosphere to about 1 atmosphere, in view of the ease of process control and process cost. The flow rate of reducing gas is zero in a closed (autoclave system) and in continuous systems the flow rate does not greatly affect the results as compared to the treating temperature, treating time, and partial pressure. Accordingly, it can be considered relatively non-critical.

Considering all of the above factors, it shall be understood by those in the art that the gas phase reducing agents recited above are not limitative, and that the most important process parameter is the treating temperature, generally the treating time and the partial presence of the gas phase reducing agent(s) being balanced thereagainst.

Gas phase reducing agent mixtures can, of course, be used, but generally no benefits substantial enough to offset complicating the system are gained to justify such. In the present invention of course, both batch and continuous operation can be used, if desired.

The Curie point of the thus treated chromium dioxide is raised by about 20°C as compared with the Curie point before the treatment. As a result of X-ray diffraction analysis of the sample, it was found that, in addition to the peak specific to $CrO_2$, there are formed substances having a peak which shows that the spacing is at least one of 3.217 ± 0.01 A, 2.520 ± 0.004 A or 1.718 ± 0.002 A. The greater the change in the Curie point, the clearer the peaks. In chromium dioxide whose Curie point is changed only a little due to a low treating temperature and a short treating period, the peaks are so weak that they are scarcely observed.

The present invention will now be illustrated in greater detail by several non-limiting examples of preferred embodiments.

EXAMPLE 1

5 Grams of chromium dioxide* having a Curie point of 115.5°C was put in a porcelain boat and placed in a reaction tube made of fused quartz. Thereafter, the chromium dioxide was heated at 200°C for 1 hour in a flowing stream of nitrogen gas containing methyl alcohol vapor. Nitrogen gas was merely bubbled through the methyl alcohol so the vapor provided a methyl alcohol vapor pressure of 0.2 atm. (estimated). After the treatment, the Curie point of the chromium dioxide was 130.4°C.

* The exact sample was follows: 800 g of $CrO_3$, 8 g of $TeO_2$ and 100 ml of water were admixed, charged to a hard glass vessel and reacted at 410 atm., 350°C, for 3 hours in the vessel (autoclave). The product obtained was crushed, washed with water and dried at 60°C for 16 hours. The average particle size was about 0.7 × 0.1 × 0.1 μ.

In this example, and all examples where used, the nitrogen gas was flown over the chromium dioxide at a rate of 1 liter/minute per 5 g of chromium dioxide (est.), and hydrogen, where used was at a similar flow rate.

When the resulting chromium dioxide was subjected to X-ray diffraction analysis, there were observed several peaks different from that of chromium dioxide. Representative peaks showed spacings at 3.217 ± 0.01 A, 2.520 ± 0.005 A and 1.178 ± 0.002 A. Of these, the strongest peak was that corresponding to 3.217 A. No peak of $Cr_2O_3$ was observed.

EXAMPLE 2

5 Grams of the same chromium dioxide as used in Example 1 was heat-treated in a stream of nitrogen gas containing butyl acetate according to the manner described in Example 1. The vapor pressure of the butyl acetate was 0.3 atm. (est.). After the treatment, the Curie point of the chromium dioxide was 127.4°C. According to X-ray diffraction analysis peaks corresponding to spacings of 3.217 ± 0.01 A and 1.718 ± 0.05 A were observed and, in addition, a peak was observed at about 2.52 A.

EXAMPLE 3

The same chromium dioxide as in Example 1 was heat-treated in the same manner as in Example 1 at 200°C for 1 hour except using nitrogen gas containing formaldehyde vapor. The vapor pressure of the formaldehyde was 0.3 atm. (est.). The Curie point of the resulting product was 125.8°C. According to X-ray diffraction analysis, peaks corresponding to spacings of 3.217 ± o.o1 A and 1.72 ± 0.01 A were observed. Also, a slight peak was observed at about 2.52 A.

EXAMPLE 4

The same treatment as described in Example 1 was conducted at 200°C for 1 hour substituting butyl alcohol for methyl alcohol. The Curie point of the product was 127.1°C.

According to X-ray diffraction, a peak corresponding to 3.227 ± 0.01 A was observed, and trace peaks were observed at 1.72 A and 2.52 A.

EXAMPLE 5

The same treatment as described in Example 4 was conducted at 120°C on the same chromium dioxide. The Curie point of the product was 121.1°C. According to X-ray diffraction analysis, a weak peak corresponding to spacing of about 3.22 A was observed. The presence of other peaks was not observed.

EXAMPLES 6 - 16

The same treatment as described in Example 1 was conducted on the same chromium dioxide as in Example 1 employing various temperatures. The results obtained are shown in Table 1. In Example 16, chromium dioxide was treated in a stream of nitrogen for comparison. No change in Curie temperature was observed.

Table 1

| Example No. | Atmosphere | Treating temp. | Curie point |
|---|---|---|---|
| 6 | Methyl alcohol + $N_2$ | 120°C | 121.1°C |
| 7 | Butyl acetate + $N_2$ | 150°C | 120.0 |
| 8 | " | 120°C | 116.2 |
| 9 | Ethyl alcohol + $N_2$ | 200°C | 132.7 |
| | The vapor pressure of the ethyl alcohol was 0.1 atm. (est.) in 9 and 10 | | |
| 10 | Ethyl alcohol + $N_2$ | 120°C | 122.9°C |
| 11 | Propionaldehyde + $N_2$ | 200°C | 122.5 |
| | The vapor pressure of the propionaldehyde was 0.3 atm. (est.) | | |
| 12 | Propionaldehyde + $N_2$ | 120°C | 122.1 |
| | The vapor pressure of the propionaldehyde was 0.3 atm. (est.) | | |
| 13 | Dimethylformamide + $N_2$ | 200°C | 128.2 |
| | The vapor pressure of the DMF was 0.04 atm. (est.) | | |
| 14 | Hydrogen gas | 200°C | 120.8 |
| 15 | " | 120°C | 116.4 |
| 16 | Nitrogen gas | 200°C | 116.4 |

EXAMPLE 17

$CrO_2$ powder containing 0.6 atomic % of Fe* and having a Curie point of 121°C was heat-treated at 200°C for 1 hour in a stream of nitrogen containing ethyl alcohol.** After the treatment, the Curie point of the sample was raised to 132°C. Thus, it was observed that the Curie point could be also be raised by applying the treatment of the present invention to a sample whose Curie point had been changed by an additive as is used in the prior art.

* The exact sample was as follows: 800 g of $CrO_3$, 8 g of $TeO_2$, 17 g of $FeSO_4 \cdot 7H_2O$ and 100 ml of water were admixed, charged into a glass vessel and reacted at 410 atm. 350°C, for 3 hours in the vessel (autoclave). The product thus obtained was crushed, washed with water and dried at 60°C for 16 hours. The average particle size was about 0.7 – 0.8 × 0.1 × 0.1 μ.

**basic prosedure was as in Ex. 1

While the invention has been described in detail and with reference to specific embodiments thereof, it will be apparent to one skilled in the art that various changes and modifications can be made therein without departing from the spirit and scope thereof.

What is claimed is:

1. A method for raising the Curie point of ferromagnetic chromium dioxide to more than 120°C, which comprises heating ferromagnetic chromium dioxide powder having a Curie point less than 120°C to a temperature more than 60°C in intimate contact with a reducing agent in the gaseous phase, wherein said ferromagnetic chromium dioxide after said heating has X-ray diffraction peaks which show a spacing at at least one of 3.217 ± 0.01A, 2.520 ± 0.004A and 1.718 ± 0.002A and a Curie point more than 120°C.

2. A method as claimed in claim 1 wherein said heating is to between 100°C and 200°C.

3. A method as claimed in claim 1 wherein said ferromagnetic chromium dioxide shows a spacing at 3.217 ± 0.01A.

4. A method as claimed in claim 1 wherein said reducing agent is hydrogen gas or an organic solvent gas.

5. A method as claimed in claim 4 wherein said reducing agent is an organic solvent gas and said organic solvent gas is selected from the group consisting of alcohols, ethers, esters and aldehydes, and these organic solvents having from 1 to 10 carbon atoms.

6. A method as claimed in claim 4 wherein said organic solvent gas is a hydrocarbon having from 1 to 10 carbon atoms.

7. The method as claimed in claim 1 where the partial pressure of reducing agent is from about 1/1000 atm. to about 1 atm.

8. The method as claimed in claim 1 where the heating is for about 30 minutes to about 24 hours.

9. The method of claim 1 wherein said gaseous phase reducing agent is hydrogen.

10. The method of claim 1 wherein said gaseous phase reducing agent is an organic solvent.

11. The method of claim 1 wherein said ferromagnetic chromium dioxide, prior to said heating, exhibits a coercive force of 400–600 oersteds, has a length of 0.3 – 1.0 microns, an axial ratio of 3:1 – 10:1 and exhibits a saturization magnetization of greater than 70 emu/g.

12. Ferromagnetic chromium dioxide having a Curie point of greater than 120°C, and X-ray diffraction peaks showing a spacing at least one of 3.217 ± 0.01A, 2.520 ± 0.004A and 1.718 ± 0.002A said ferromagnetic chromium dioxide obtained by heating a ferromagnetic chromium dioxide powder having a Curie point lower than 120°C to a temperature more than 60°C in intimate contact with a reducing agent in the gaseous phase.

* * * * *